Patented July 30, 1935

2,009,596

UNITED STATES PATENT OFFICE 2,009,596

PROCESS OF PREPARING NAPHTHALENE-
1,4,5,8-TETRACARBOXYLIC ACIDS AND
NEW DERIVATIVES OF SUCH ACIDS

Heinrich Vollmann and Martin Corell, Frankfort-
on-the-Main, Germany, assignors to General
Aniline Works, Inc., New York, N. Y., a corpo-
ration of Delaware No Drawing. Application May 22, 1933, Serial
No. 672,342. In Germany May 25, 1932

7 Claims. (Cl. 260—108)

The present invention relates to a process of preparing naphthalene - 1,4,5,8 - tetracarboxylic acids and to new derivatives of such acids.

We have found that naphthalene-tetracarboxylic acids are obtainable with very good yields by heating with sulfuric acid of high concentration a pyrene compound which contains at least one halogen atom in 8- or 10-position and at least one further halogen atom of the same kind in 3- or 5-position and oxidizing, with or without previous isolation, the pyrenequinones obtained to the naphthalene-1,4,5,8-tetracarboxylic acids. As halogens there may be used chlorine or bromine.

By heating di-, tri- or tetra-halogenpyrenes with concentrated sulfuric acid or fuming sulfuric acid, the halogen derivatives which are at first practically insoluble gradually dissolve to a brown solution. The temperature required therefor depends upon the concentration of the sulfuric acid and the kind of the halogen in the halogenpyrene, that is to say bromine derivatives react more easily than chlorine derivatives and fuming sulfuric acid reacts more easily than sulfuric acid of 96% strength. The reactions which take place lead to the substitution of hydroxyl for halogen and the hydroxyl groups may be dehydrogenated by pairs to form the corresponding pyrenequinones. By working at higher temperatures,—as indicated in the examples herein—, it is possible to replace in a smooth reaction all the halogen in the tetrachlorpyrene by hydroxyl; by the dehydrogenation which occurs simultaneously there is obtained in this case a yield of above 90% of the di-peri-naphthindandion (3,4,5,8,9,10-hexahydro - 3,5,8,10 - tetra-ketopyrene. Formula III) which was hitherto unknown in a pure state. If tetra-chlorpyrene is used the course of reaction may be illustrated by the following scheme:

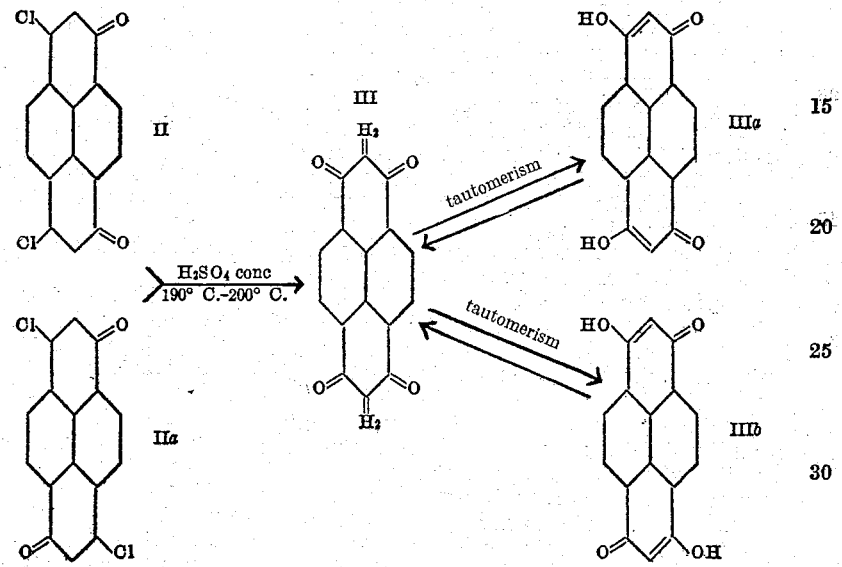

Tetrabrompyrene principally reacts in the same way, but instead of the diindandione (Formula III) a dibromderivative thereof is obtained since the primarily formed hydrogen bromide is dehydrogenated to bromine by the action of the sulfuric acid at the temperature of about 150° C. which is necessary for the hydrolysis and since the diindandione of Formula III obtained is brominated by the action of the bromine.

The halogenpyrenequinones obtained as intermediate products (probably mixtures of two isomers corresponding to Formulae II and IIa) are yellow-brown to red-brown products which are insoluble in cold aqueous alkali but dissolve easily in an alkaline hydrosulfite solution to a yellow solution. The diindandione obtainable by working at a higher temperature (compound of Formula III and the dibromo derivative thereof) are soluble in aqueous alkalies to a brown solution; the brown color of the solution turns yellowish on addition of hydrosulfite.

The described intermediate products may be oxidized directly to the naphthalene-1,4,5,8-tetracarboxylic acids in the acid solution which has been obtained by their preparation, for instance, by addition of nitric acid or pyrolusite. But it is also possible to isolate the halogen quinones and the diindandions, respectively, by pouring the acid solution into water, filtering with suction and washing the solid matter and to oxidize them in an alkaline solution or suspension to the naphthalene-tetracarboxylic acids by addition of, for instance, sodium hypochlorite solution.

Instead of the pure 3,5,8,10-tetrahalogenpyrenes there may also be used mixtures thereof with the corresponding less highly halogenated pyrenes as they may be obtained, for instance, by directly chlorinating pyrene.

In an analogous manner there may be converted more highly halogenated pyrenes into the corresponding halogenated naphthalene-1,4,5,8-tetracarboxylic acids, for instance, a hexachlorpyrene to the corresponding dichlornaphthalene-tetracarboxylic acid or decachlorpyrene to tetrachlornaphthalene-1,4,5,8-tetracarboxylic acid.

The following examples serve to illustrate the invention, but they are not intended to limit it thereto, the parts being by weight:

(1a) 34 parts of 3,5,8,10-tetrachlorpyrene (melting at 367° C. and obtainable by chlorination of pyrene in trichlorobenzene with chlorine or in nitrobenzene with sulfuryl chloride at temperatures of about 20° C. to about 100° C. or by reaction of tetranitropyrene (melting at 335° C.) with phosphorus pentachloride in boiling trichlorobenzene) are stirred with 530 parts of fuming sulfuric acid containing 20% of $SO_3$ for about 40 minutes at 80° C. whereby a clear brown solution is obtained. This is diluted by addition of 110 parts of sulfuric acid of 60° Bé. whereby hydrochloric acid escapes with evolution of heat. The solution then probably contains a mixture of 3,8-dichloropyrenequinone -5,10 and 5,8-dichloro-pyrenequinone-3,10.

The whole is heated up to about 180° C. to 200° C. in the course of 30 minutes and heating is continued until a test portion taken from the mixture dissolves entirely in cold dilute sodium carbonate solution to a light brown solution (about 5 to about 10 minutes). The hot mixture is then diluted by adding, drop by drop, 200 to 250 parts of water. Thereby, brown laminæ or flat needles of a sulfate having a metallic luster separate, on cooling, in the form of a thick magma. By filtering with suction through an acid-proof filter and boiling the residue with water, filtering with suction and washing the solid matter pure peri-di-naphthindandion is obtained in the form of light brown crystalline flakes. The yield amounts to 25 parts (92% of that of the theory).

The peri-di-naphthindandion which, hitherto, has been known only in an impure state (cf. Freund and Fleischer, "Annalen der Chemie", vol. 402, page 78 (1914) crystallizes from its hot solution in sulfuric acid of 60° Bé. as a sulfate in the form of flat needles having a metallic luster. In a solution of sodium carbonate the di-indandion easily dissolves to a brown solution and is precipitated, on acidification, in the form of brown flakes. In boiling nitrobenzene the di-indandion is practically insoluble. By warming it with acetic acid anhydride a brown-orange solution is obtained from which red-orange brilliant needles of a di-acetoxy-pyrenequinone crystallize which decompose at 220° C. to 240° C. while blackening.

(1b) 25 parts of the di-perinaphthindandion obtained according to Example 1a are dissolved in 500 parts of water with 15 parts of sodium carbonate and sodium hypochlorite solution is added, drop by drop, at water-bath temperature, while stirring, until the solution or the suspension, respectively, has become entirely colorless. On acidification, colorless needles of naphthalene-1,4,5,8-tetracarboxylic acid are precipitated. After cooling, the whole is filtered with suction, the solid matter is washed with acidulated water and dried. The yield amounts to about 90% of that of the theory.

(2a) 52 parts of 3,5,8,10-tetrabrompyrene (feebly yellow needles, melting at 402° C. and obtainable by bromination of pyrene in nitrobenzene at 20° C. to 120° C. with a yield of 96% of that of the theory) are stirred with 500 parts of sulfuric acid of 66° Bé. and heated. At 130° C. to 140° C. reaction occurs with evolution of hydrogen bromide, bromine and $SO_2$ whereby the needles of the tetrabrompyrene disappear gradually and a clear brown solution is obtained.

By diluting the warm solution with water until crystallization sets in there are obtained, on cooling, dark needles of a sulfate having a metallic luster which, after filtering with suction and decomposition with water, yields red-brown flakes of a dibromo-di-peri-naphthindandion. By adding to the suspension of this product in water a small quantity of caustic soda solution, the suspended matter begins to dissolve to a brown solution. By adding some more caustic soda solution, a crystalline brown-grey sodium salt is precipitated. By heating the solution with acetic acid anhydride and a trace of sulfuric acid, brilliant red-orange needles of di-bromodiacetoxypyrenequinone are obtained, which decompose at about 270° C. while darkening.

The dibromo-di-peri-naphthindanion obtained may be further oxidized to the naphthalene-tetracarboxylic acid analogously to Example 1b in an alkaline medium or according to the example following hereafter in a solution acid with sulfuric acid.

(2b) 1002 parts of 3,5,8,10-tetrabrompyrene are stirred at 160° C. to 170° C. for 1½ hours with 9000 parts of sulfuric acid monohydrate, whereupon from about 120° C. strong evolution of hydrogen bromide sets in. The whole is then allowed to cool to about 120° C. and 1125 parts of nitric acid (specific gravity 1.5) are added drop by drop in the course of 45–60 minutes, the temperature not being allowed to rise much above 180° C. The faintly yellow solution is thereupon diluted with about 30,000 parts of water and the weakly yellow suspension obtained is filtered with suction, after cooling, and the solid matter is washed with dilute hydrochloric acid until free from sulfuric acid. After drawing, there are obtained 455 parts of pure naphthalene-1,4,5,8-tetracaroxylic acid anhydride, i. e. 87% of the theory calculated upon tetrabrompyrene or 83% of the theory calculated upon pyrene.

(3) 52 parts of 3,5,8,10-tetrabrompyrene are stirred for 1 hour at 160° C. with 900 parts of sulfuric acid monohydrate, the brown solution is then cooled to 120° C. and pyrolusite is gradually added at 120° C. to 150° C., while externally cooling until the solution has assumed a light coloration. It is then diluted with water, any excess of pyrolusite is dissolved by addition of bisulfite solution and the nearly colorless tetracarboxylic acid which has precipitated is filtered with suction. The yield amounts to 70% of that of the theory.

(4) 85 parts of technically pure 3,5,8,10-tetrachlorpyrene (obtainable by treatment of pyrene in 15 times its weight of trichlorobenzene with chlorine at temperatures from 30° C. to 100° C., the introduction of chlorine being continued until a test portion taken from the mixture after filtering with suction, washing with benzene and drying shows a melting point of 355° C. to 360° C.) are stirred in 1600 parts of fuming sulfuric acid of 20% SO₃ and the solution is heated for 1 hour at 80° C. to 90° C. 870 parts of sulfuric acid of 60° Bé. are then run in whereby the chlorsulfonic acid which has been formed by the decomposition of the tetrachlorpyrene is decomposed with evolution of HCl. Into the brown solution there are then run in the course of about 1 hour 165 parts of nitric acid (specific gravity 1.5) so that the internal temperature does not exceed 140° C. The oxidation is generally finished after the introduction of nitric acid. If necessary, a further 5–7 parts of nitric acid may be added and the batch be heated to 160° C. for a short time. The light, weakly brownish-yellow solution is then diluted with water and the naphthalenetetracarboxylic acid anhydride which has precipitated is worked up as described in Example 2b. The yield amounts to 59 to 63 parts, i. e. 88 to 94 per cent. of that of the theory calculated upon tetrachloropyrene.

In the same manner mixtures of di-, tri- and tetrachlorpyrene (obtainable by chlorinating pyrene and interrupting the process when the melting point of a test portion taken from the mixture lies between about 250° C. and about 345° C.) may be converted into naphthalenetetracarboxylic acid. The optimum quantity of nitric acid to be used for the oxidation of such mixtures may easily be ascertained by some preliminary experiments.

(5) 85 parts of tetra-chlorpyrene are transformed into the quinone by means of fuming sulfuric acid as described in the preceding example and the solution is diluted with sulfuric acid of 60° Bé. Thereupon, a solution of hydrogen peroxide of 30% strength is gradually run in at a temperature between 50° C. and 150° C. until the solution has assumed a light brownish-yellow color (about 500 parts H₂O₂ of 30% strength are consumed).

The naphthalenetetracarboxylic acid formed partly precipitates in the form of its anhydride even during the introduction of the hydrogen peroxide. That part of the tetracarboxylic acid which is still dissolved, is precipitated by dilution with water. The product is worked up as described in Example 2b. The yield amounts to about 50 parts (75% of the theory).

(6) 41 parts of hexachlorpyrene (obtainable in the form of yellow needles which melt at 383° C. by chlorination of pyrene to 1,2,3,5,6,7,8,10-octochloro-1,2,6,7-tetrahydropyrene and splitting off of 2 mol. HCl by means of an alcoholic alkali and crystallizing from nitrobenzene) are stirred with 800 parts of fuming sulfuric acid of 20% of SO₃ for 1 hour at 80° C. to 90° C., the whole is diluted by gradual addition of 410 parts of sulfuric acid of 60° Bé: and 90 parts of nitric acid (specific gravity 1.5) are dropped in, while further stirring, at a temperature of between 90° C. and 145° C. The whole is then heated for a short time to 150° C. to 170° C. until the solution has become faintly yellow, diluted with water and ice and the faintly yellow dichlornaphthalenetetracarboxylic acid anhydride which has separated is filtered with suction. The yield amounts to 75–80% of that of the theory.

The acid probably is a mixture of two isomeric acids of the following constitution:

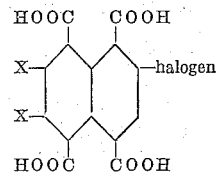

wherein one of the X's means halogen and the other X hydrogen.

By recrystallization of the crude product from trichlorobenzene with addition of acetic acid anhydride it may easily be separated into 2 isomeric dichlornaphthalenetetracarboxylic acids. The difficultly soluble isomer (probably 2,6-dichlornaphthalene-1,4,5,8-tetracarboxylic acid anhydride) crystallizes in the form of brilliant, nearly colorless laminæ melting at 390° C. The freely soluble isomer (probably the 2,7-derivative) has a constant melting point of about 300° C. From a mixture of trichlorobenzene and acetic acid anhydride it crystallizes as the anhydride in the form of large brilliant leaflets which, on drying, lose their luster. On addition of sodium hydrosulfite to the suspension of the anhydride of each isomer in cold aqueous sodium carbonate solution the body dissolves to a deep green solution.

(7) 11 parts of decachlorpyrene (obtainable by chlorination of hexachlorpyrene, cf. the preceding example) in chlorsulfonic acid in the presence of iodine at 0° C., filtration with suction of the polychlorpyrene-polychloride which separates and contains 12–14 atoms of Cl, heating of the chloride for splitting off HCl and recrystallizing from benzene in the form of yellow brilliant tablets which, on drying, lose their luster, have a constant melting point of 264° C. and contain 64.9% of chlorine) are stirred in 200 parts of fuming sulfuric acid of 20% of SO₃ for 2 hours at 110° C. and the solution is then diluted with 80 parts of sulfuric acid of 60° Bé. By dropping in of about 25 parts of nitric acid (specific gravity 1.5) at a temperature of 150° C. to 180° C. oxidation takes place, the solution is then diluted with water and the tetrachlornaphthalene-1,4,5,8-tetracarboxylic acid anhydride which has separated and has a faintly yellow color is isolated as indicated in the preceding examples. It crystallizes from nitrobenzene in faintly yellow laminæ which darken above 350° C. and melt at 400° C.

We claim:

1. The process which comprises heating with sulfuric acid of high concentration a pyrene which contains at least one halogen atom of the group consisting of chlorine and bromine in 8- or 10-position and at least one further halogen atom of the same kind in 3- or 5-position and oxidizing the pyrenequinone compound thus obtained to the corresponding naphthalene-tetracarboxylic acid.

2. The process which comprises heating with sulfuric acid of high concentration a compound of the group consisting of 3,5,8,10-tetrachlorpyrene and 3,5,8,10-tetrabrompyrene and oxidizing the pyrenequinone compound thus obtained to the corresponding naphthalene-tetracarboxylic acid.

3. The process which comprises heating for about 1 hour at a temperature of about 80° C. 3,5,8,10-tetrachlorpyrene with fuming sulfuric acid containing about 20% of SO₃ and oxidizing the pyrenequinone compound thus obtained to the corresponding naphthalene-tetracarboxylic acid.

4. The process which comprises stirring for about 40 minutes at a temperature of about 80° C. a mixture of 3,5,8,10-tetrachlorpyrene with fuming sulfuric acid containing 20% of SO₃, diluting the mixture with sulfuric acid of 60° Bé., heating to about 180° C. to about 200° C., precipitating peri-di-naphthindandion thus obtained by diluting with water and oxidizing the precipitate to the corresponding naphthalene-tetracarboxylic acid.

5. The compounds of the formula:

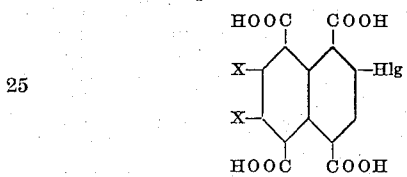

wherein Hlg means a halogen of the group consisting of chlorine and bromine and one of the X's means a halogen of the same kind and the other X hydrogen.

6. The compound of the formula:

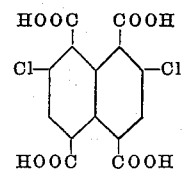

which has a constant melting point of about 300° C. and crystallizes from a mixture of trichlorobenzene and acetic acid anhydride as the anhydride in the form of large brilliant leaflets which, on drying, lose their luster, its suspension in aqueous cold sodium carbonate solution dissolving on addition of sodium hydrosulfite to a deep green solution.

7. The compound of the formula:

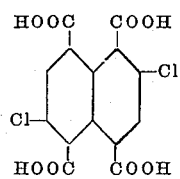

crystallizing in brilliant nearly colorless leaflets and melting at 390° C., the suspension of its anhydride in aqueous cold sodium carbonate solution dissolving on addition of sodium hydrosulfite to a deep green solution.

HEINRICH VOLLMANN.
MARTIN CORELL.